United States Patent [19]
Takahashi et al.

[11] Patent Number: 5,644,681
[45] Date of Patent: Jul. 1, 1997

[54] LEARNING METHOD FOR NEURAL NETWORK HAVING DISCRETE INTERCONNECTION STRENGTHS

[75] Inventors: Masanobu Takahashi; Shuichi Tai, both of Hyogo-ken, Japan; Keisuke Kojima, Breinigsville, Pa.; Toshio Shinnishi; Kazuo Kyuma, both of Hyogo-ken, Japan

[73] Assignee: Mitsubishi Denki Kabushiki Kaisha, Tokyo, Japan

[21] Appl. No.: 363,597

[22] Filed: Dec. 23, 1994

Related U.S. Application Data

[63] Continuation of Ser. No. 963,083, Oct. 19, 1992, abandoned, which is a continuation-in-part of Ser. No. 622,516, Dec. 5, 1990, abandoned.

[30] Foreign Application Priority Data

Dec. 18, 1989 [JP] Japan ................................. 1-327704

[51] Int. Cl.$^6$ ...................................................... G06F 15/18
[52] U.S. Cl. ............................................. 395/23; 395/25
[58] Field of Search ................................. 395/23, 24, 25

[56] References Cited

U.S. PATENT DOCUMENTS

| | | | |
|---|---|---|---|
| 4,918,618 | 4/1990 | Tomlinson, Jr. | 364/513 |
| 4,947,482 | 8/1990 | Brown | 364/807 |
| 4,994,982 | 2/1991 | Duranton et al. | 364/513 |
| 5,008,833 | 4/1991 | Agranat et al. | 364/513 |
| 5,052,043 | 9/1991 | Gaborski | 382/14 |

FOREIGN PATENT DOCUMENTS

| | | | |
|---|---|---|---|
| 3-188554 | 8/1991 | Japan | G06F 15/18 |

OTHER PUBLICATIONS

Shuichi Tai, et al., "Recognition of 26 character-alphabet using a dynamic opto-electronic neural network", Int'l Joint Conference on Neural Networks, Jan. 15–19, 1990, Washington, D.C.

Nabil H. Farhat, "Optoelectronic analogs of self-programming neural nets: architecture and methodologies for implementing fast stochastic learning by simulated annealing", Applied Optics, vol. 26, No. 23, Dec. 1, 1987, pp. 5093–5103.

Hans P. Graf et al., "VLSI Implementation of a Neural Network Model", Computer, Mar. 1988, pp. 41–49.

Marcin Skubiszewski, "A Hardware Emulator For Binary Neural Works", International Neural Network Conference, Jul. 9–13, 1990.

Patrick A. Shoemaker et al., "Back Propagation Learning With Trinary Quantization of Weight Updates", Neural Networks, vol. 4, No. 2, 1991, pp. 231–241.

A de Callatay, "All-or-None Connections or Variable Weights?", Parallel Processing in Neural Systems and Computers, 1990, p. 233–236.

Donald R. Tveter, "Better Speed Through Integers", AI Expert Nov. 1990, pp. 40–46.

E. Fiesler, et al., "A weight discretization paradigm for optical neural networks", SPIE, vol. 1281 Optical Interconnections and Networks (1990), pp. 164–173.

Jack Raffel, et al., "A Generic Architecture for Wafer-Scale Neuromorphic Systems", M.I.T. Lincoln Laboratory, pp. 99–111.

Rumelhart, "Training Hidden Units: The Generalized Delta Rule", The Massachusetts Institute of Technology, 1988, pp. 121–160.

(List continued on next page.)

*Primary Examiner*—Robert W. Downs
*Attorney, Agent, or Firm*—Wolf, Greenfield & Sacks, P.C.

[57] ABSTRACT

A learning method for a neural network, in which at least a portion of the interconnection strength between neurons takes discrete values, includes the steps of updating an imaginary interconnection strength taking continuous values by using the quantity of update of the interconnection strength which has been calculated by using the discrete interconnection strength, and discretizing the imaginary interconnection strength so as to provide a novel interconnection strength.

25 Claims, 5 Drawing Sheets

OTHER PUBLICATIONS

Alan F. Murray and Anthony V.W. Smith, "Asynchronous VLSI Neural Networks Using Pulse–Stream Arithmetic", Reprinted from IEEE Journal of Solid State Circuits, vol. 23, Jun. 1988.

Masaya Oita, et al., "Character recognition using a dynamic optoelectronic neural network with unipolar binary weights," Optics Letters, vol. 15, No. 21, Nov. 1, 1990, pp. 1227–1229.

Von Lehman, et al., "Influence of interconnection weight discretization and noise in an optoelectronic neural network", Optics Letters, vol. 14, No. 17, Sep. 1, 1989, pp. 928–930.

E. Fiesler, A. Choudry, & H.J. Caulfield, "Weight discretization in backward error propagation neural networks", presented at the First Annual Meeting of the International Neural Network Society, Boston, MA, Sep. 5–10, 1988, abstract: Neural networks, vol. 1, supplement 1, p. 380, 1988.

A Weight discretization paradigm for optical Neural Networks E Fiesler Mar. 13–15 1990, pp. 164–173 SPIE vol. 1281 Nerocomputing.

Hecht Nielsen/Addison Wesley (1989).

Neural Computing, Theory and Practice

Wasserman/Van Nostrand Reinhold (1989).

LEARNING METHOD FOR NEURAL NETWORK HAVING DISCRETE INTERCONNECTION STRENGTHS

CROSS-REFERENCE TO RELATED APPLICATIONS

This application is a continuation application Ser. No. 07/953,083, filed Oct. 19, 1992, now abandoned which is a continuation in part of application Ser. No. 07/622,516, filed Dec. 5, 1990 now abandoned.

This application claims the benefit under 35 U.S.C. §120 and is a continuing application of application of the same title, Ser. No. 07/622,516 filed Dec. 5, 1990, now abandoned.

BACKGROUND OF THE INVENTION

1. Field of the Invention

The present invention relates to a learning method in a neural network having discrete interconnection strengths, such as an optical neuron computer.

2. Description of the Related Art

Figure 1:
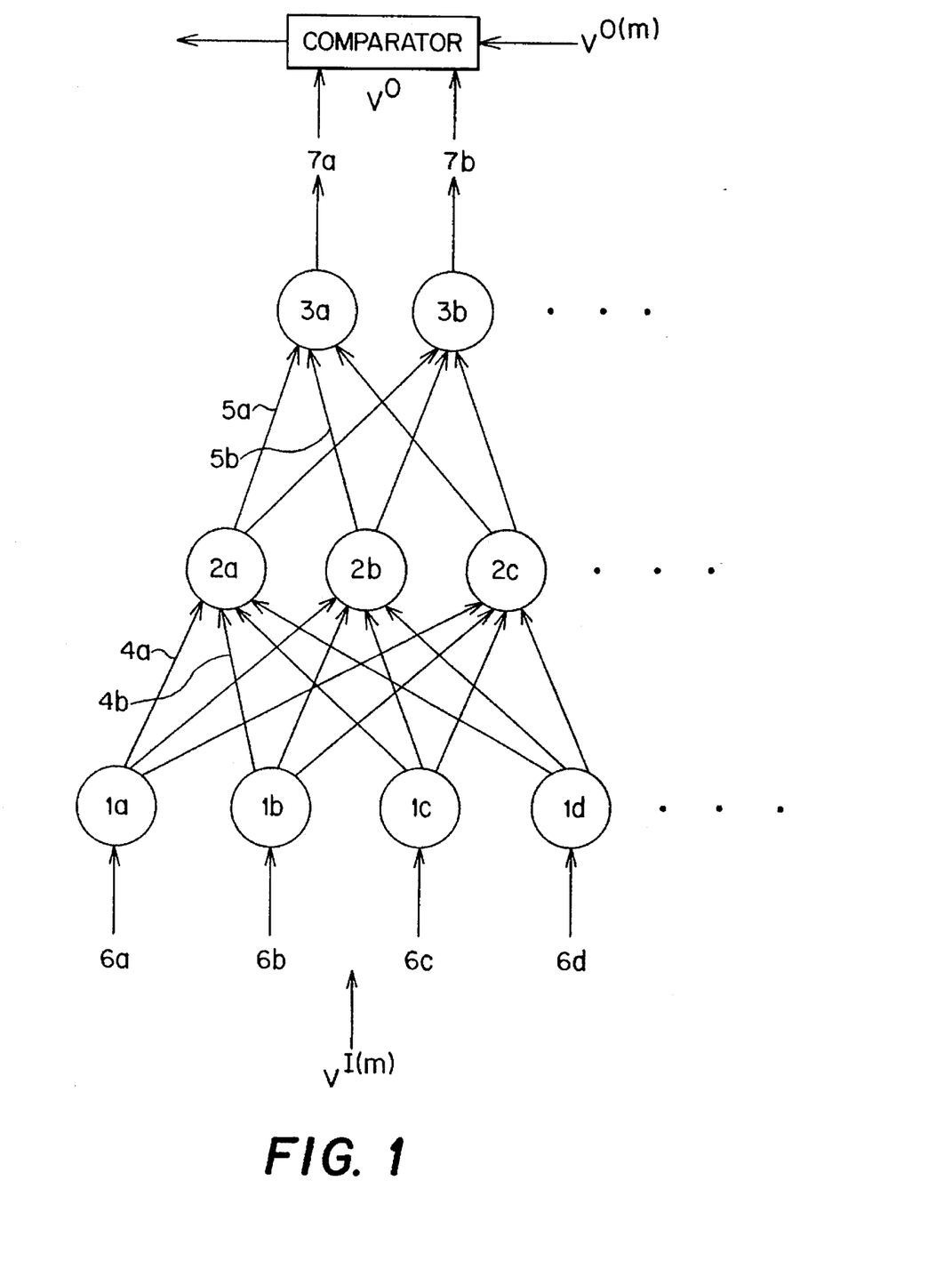
FIG. 1 illustrates the structure of a typical layered neural network.
Figure 2:
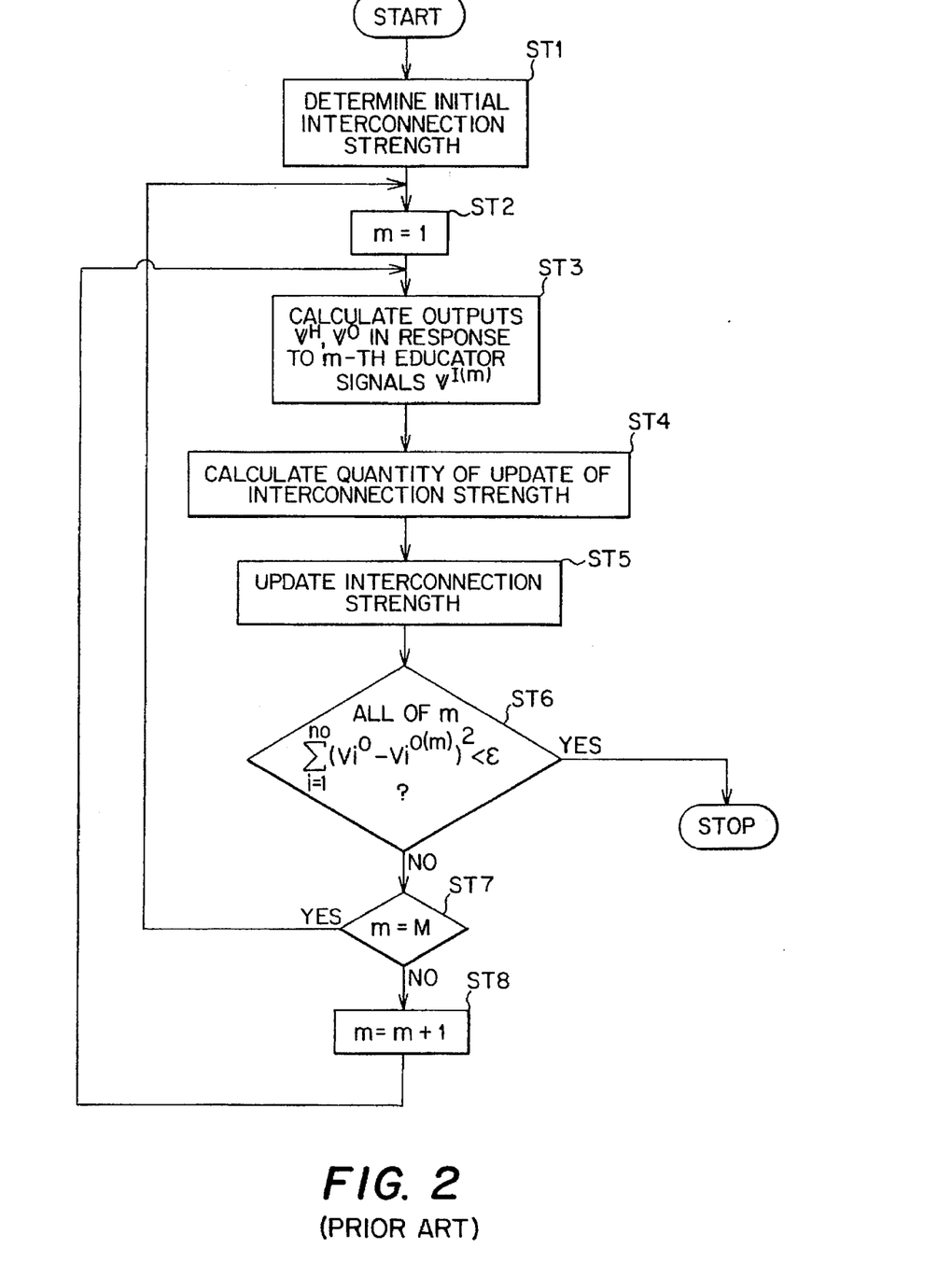
FIG. 2 is a flowchart which illustrates the operation of a conventional learning method for a neural network.

FIG. 1 illustrates the structure of a typical layered neural network. FIG. 2 is a flow chart which illustrates the operation of such a neural network. A layered network of the type described above has been disclosed, for example, in *Primer on Neural Networks*, pp. 55 to 57, edited by Amari and Mori, published by Trikeps Corporation, Nov. 30, 1985.

Referring to FIG. 1, reference numerals $1a$, $1b$, represent neurons which constitute an input layer of a neural network $2b$, $2b$, . . . , represent neurons which constitute an intermediate layer; $3a$, $3b$, . . . , represent neurons which constitute an output layer; $4a$, $4b$, . . . , represent interconnections between the neurons in the input layer and those in the intermediate layer; $5a$, $5b$, . . . , represent interconnections between neurons in the intermediate layer and those in the output layer $6a$, $6b$, . . . , represent input signals; and $7a$, $7b$, . . . , represent output signals.

In accordance with a total input I and threshold $\theta$, a single neuron transmits an output V given from the following equation:

$$V=f(I-\theta) \text{ where } f(I-\theta)=1/[1+\exp(-I-\theta)]. \tag{1}$$

Allowing the number of neurons in the input layer, the intermediate layer and the output layers to be $n_I$, $n_H$ and $n_O$, respectively, the output from the i-th neuron in each of the layers to be $V^I i$, $V^H i$ and $V^O i$, respectively, and the thresholds to be $\theta^I i$, $\theta^H i$ and $\theta^O i$, respectively, the outputs from the i-th neurons in the intermediate layer and the output layer can be respectively given from the following equations:

$$V^H i = f\left( \sum_{j=1}^{n_I} W^{IH}{}_{ij} \cdot V^I j - \theta^H i \right) \tag{2}$$

$$V^O i = f\left( \sum_{j=1}^{n_H} W^{HO}{}_{ij} \cdot V^H j - \theta^O i \right) \tag{3}$$

where $W^{IH}{}_{ij}$ represents the interconnection strength between the i-th (i=1, 2, . . . , $n_H$) neuron in the intermediate layer and the j-th (j=1, 2, . . . , $n_I$) neuron in the input layer and $W^{HO}{}_{ij}$ represents the interconnection strength between i-th (i=1, 2, . . . , $n_O$) neuron in the output layer and the j-th (j=1, 2, . . . , $n_H$) neuron in the intermediate layer.

Therefore, when an output $V^I=(V^I 1, V^I 2 \ldots, V^I n_I$ is determined, in response to an input signal to the neurons $1a$, $1b$, . . . , which constitute the input layer, an output $V^O=(V^O 1, V^O 2 \ldots, V^O n_O)$ from the neurons $3a$, $3b$, . . . , which constitute the output layer, is determined from Equations (2) and (3).

Usually, "learning" in a neural network is a process of updating the interconnection strengths $W^{IH}{}_{ij}$ and $W^{HO}{}_{ij}$ in such a manner that the neurons $3a$, $3b$, . . . , in the output layer transmit a specific output $V^{O(m)}$ with respect to a certain output $V^{I(m)}$ from the neurons $1a$, $1b$, . . . , in the input layer. In the learning process, the above-described plurality of specific outputs $V^{I(m)}$ from the input layer and corresponding desired outputs $V^{O(m)}$ from the output layer are called "educator signals".

The operation of learning in such a neural network will now be described with reference to the flowchart of FIG. 2.

First, all of the initial values of the interconnection strengths are set by using random numbers (step ST1). The variable m (m=1, 2, . . . , M), for denoting the m-th educator signal is initialized (step ST2). Then, the actual output signal $V^O$ from the neural network, corresponding to $V^{I(m)}$ of the m-th educator signal, is calculated by using Equations (2) and (3) (step ST3). A quantity for updating each interconnection strength is then calculated by using the following equations (step ST4):

$$\Delta W^{IH}{}_{ij} = -\alpha V^H i (1-V^H i) V^I j \sum_{k=1}^{n_O} V^O k (1-V^O k) W^{HO}{}_{ki} (V^O k - V^{O(m)} k) \tag{4}$$

$$\Delta W^{HO}{}_{ij} = -\alpha V^O i (1-V^O i) V^H j (V^O i - V^{O(m)} i) \tag{5}$$

where $\Delta W^{IH}{}_{ij}$ and $\Delta W^{HO}{}_{ij}$ respectively represent the update quantity by which interconnection strengths $W^{IH}{}_{ij}$ and $W^{HO}{}_{ij}$ are updated and where coefficient $\alpha(0<\alpha \leq 1)$ represents the learning rate.

Then, each interconnection strength is updated according to the following equation by the update quantity obtained in step ST4 (step ST5):

$$W^{IH}{}_{ij}(\text{new})=W^{IH}{}_{ij}(\text{old})+\Delta W^{IH}{}_{ij} \tag{6}$$

$$W^{HO}{}_{ij}(\text{new})=W^{HO}{}_{ij}(\text{old})+\Delta W^{HO}{}_{ij} \tag{7}$$

For each educator signal m (M signals), the square error between the actual output signal $V^O$ hand the desired output $V^{O(m)}$, corresponding to $V^{I(m)}$ of the educator signal m, is calculated for each neuron in the output layer. If any of the sums of these square errors is less than a convergence criterion value $\epsilon$ (usually a value less than 0.01 $n_O$ is used), learning is ended (step ST6). If any of the above-described square errors exceeds $\epsilon$ and the educator signal which has been learned immediately before is the M-th signal (step ST7), the variable m is again initialized (step ST2). Then learning is repeated by incrementing the variable m by one until the actual outputs $V^O$ of the network, with respect to all $V^{I(m)}$ of the M educator signals are sufficiently approximate to all of the desired outputs $V^{O(m)}$ (step ST8).

In the conventional learning method for a neural network, the inter-connection strengths must be taken from a continuous range of values in order to be updated. Therefore, learning cannot be performed using this method in a neural network which has a discrete interconnection strength, such as in an optical neuro-computer.

SUMMARY OF THE INVENTION

Accordingly, an object of the present invention is to provide a learning method for use in a neural network having a discrete interconnection strength and to improve the function and performance of such a neural network.

The present invention provides a learning method for a neural network, having an interconnection strength which is discrete. The method of learning comprises the steps of calculating a quantity of update based on the discrete interconnection strength, updating an imaginary interconnection strength, taken from a continuous range of values, by the calculated quantity of update, and discretizing the updated imaginary interconnection strength so as to modify and update the interconnection strength.

The learning method in a neural network according to the present invention is such that an imaginary interconnection strength, taken from a range of continuous values, is induced. A quantity of update, calculated using a discrete interconnection strength related to the imaginary interconnection strength, is added to the imaginary interconnection strength, which are then discretized. Therefore, the quantities of update of the same interconnection strengths are stored in the imaginary interconnection strength. Therefore, learning in a neural network having a discrete interconnection strength can be performed. As a result, the function and performance of the neural network can be improved.

Other and further objects, features and advantages of the invention will be more apparent from the following description.

DESCRIPTION OF THE PREFERRED EMBODIMENT

Figure 3:
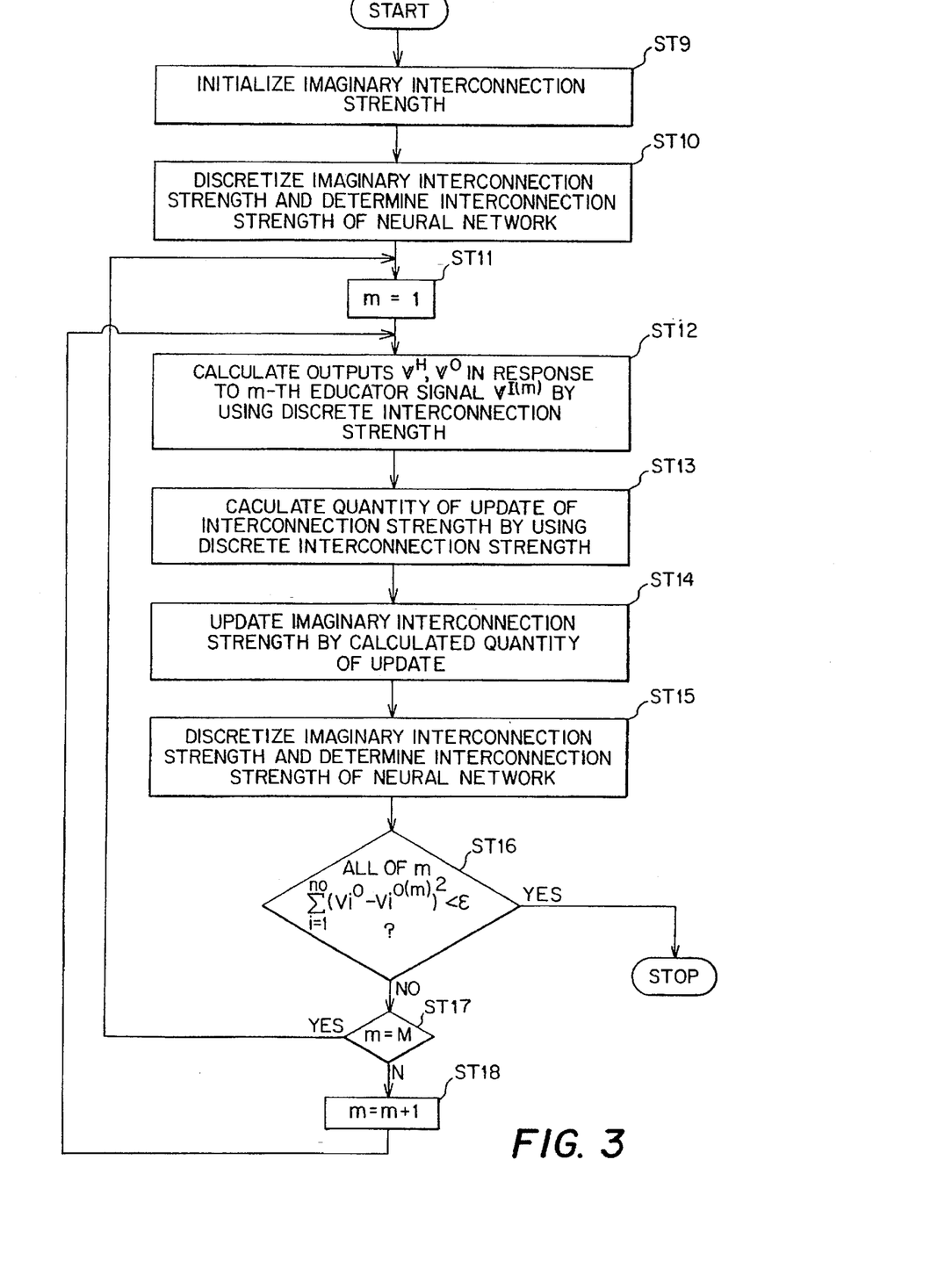
FIG. 3 is a flowchart which illustrates the operation of a learning method for a neural network according to an embodiment of the present invention.

A preferred embodiment of the present invention will now be described with reference to the drawing. FIG. 3 is a flowchart which illustrates the operation of a neural network according to the present invention in which the back-propagation method is applied to a neural network having discrete interconnection strengths. The neural network is generally similar to a conventional neural network (see FIG. 1), in the form of a triple-layer shape which learns educator signals $V^{I(m)}$, $V^{O(m)}$ (m=1, 2, ..., M). However, the interconnection strength of interconnections $4a$ and $4b$, between the neurons in the input layer and the neurons in the intermediate layer, and the interconnection strength of interconnections $5a$ and $5b$, between the neurons in the intermediate layer and neurons in the output layer, are limited to discrete values (for example, 0, 1 and 2). Such neural networks include optical and opto-electronic neural networks, optical neuro-computers, resistor-type neural networks, digital computer neural network implementations, and neural networks using pulse-stream arithmetic.

Figure 4A:
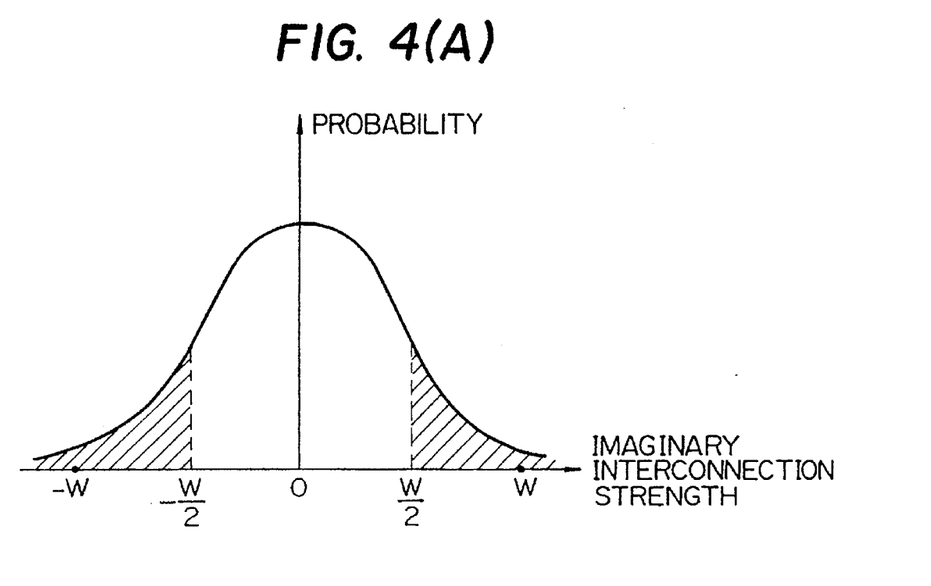
FIGS. 4A and 4B illustrate the intensity distribution of imaginary interconnection strength induced according to the present invention.
Figure 4B:
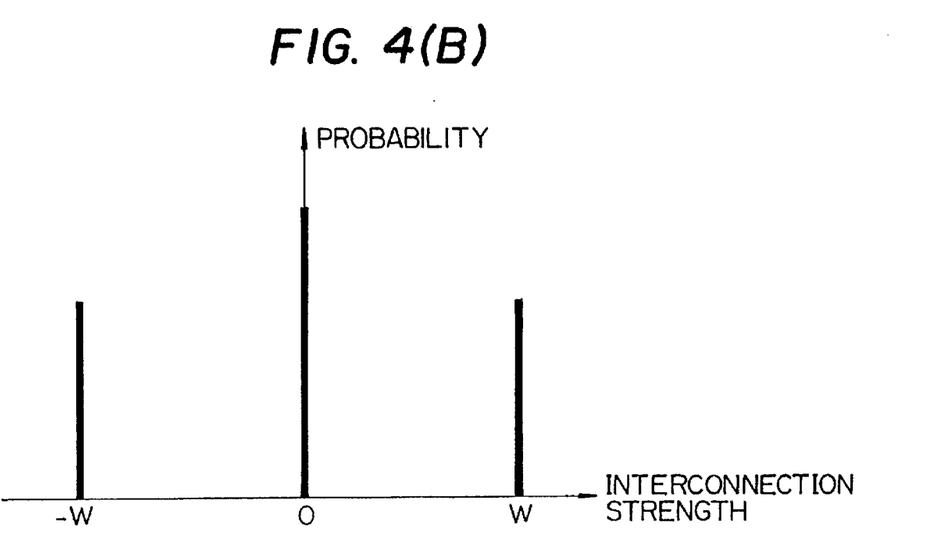

FIGS. 4A and 4B illustrate the relationship of imaginary interconnection strengths to discrete interconnection strengths. FIG. 4A illustrates the distribution of imaginary interconnection strengths $W^{IH}_{ij}$ and $W^{HO}_{ij}$ and FIG. 4B illustrates the distribution of discrete strengths $\underline{W}^{IH}_{ij}$ and $\underline{W}^{HO}_{ij}$. The discrete strength is $-W$ when the imaginary interconnection strength which takes a continuous value is less than $-W/2$; 0 when the imaginary interconnection strength is greater than $-W/2$ and less than $W/2$; and $W$ when the imaginary interconnection strength is greater than $W/2$.

The operation of a learning method with this neural network will now be described with reference to the flowchart of FIG. 3 and system diagram of FIG. 5.

Figure 5:
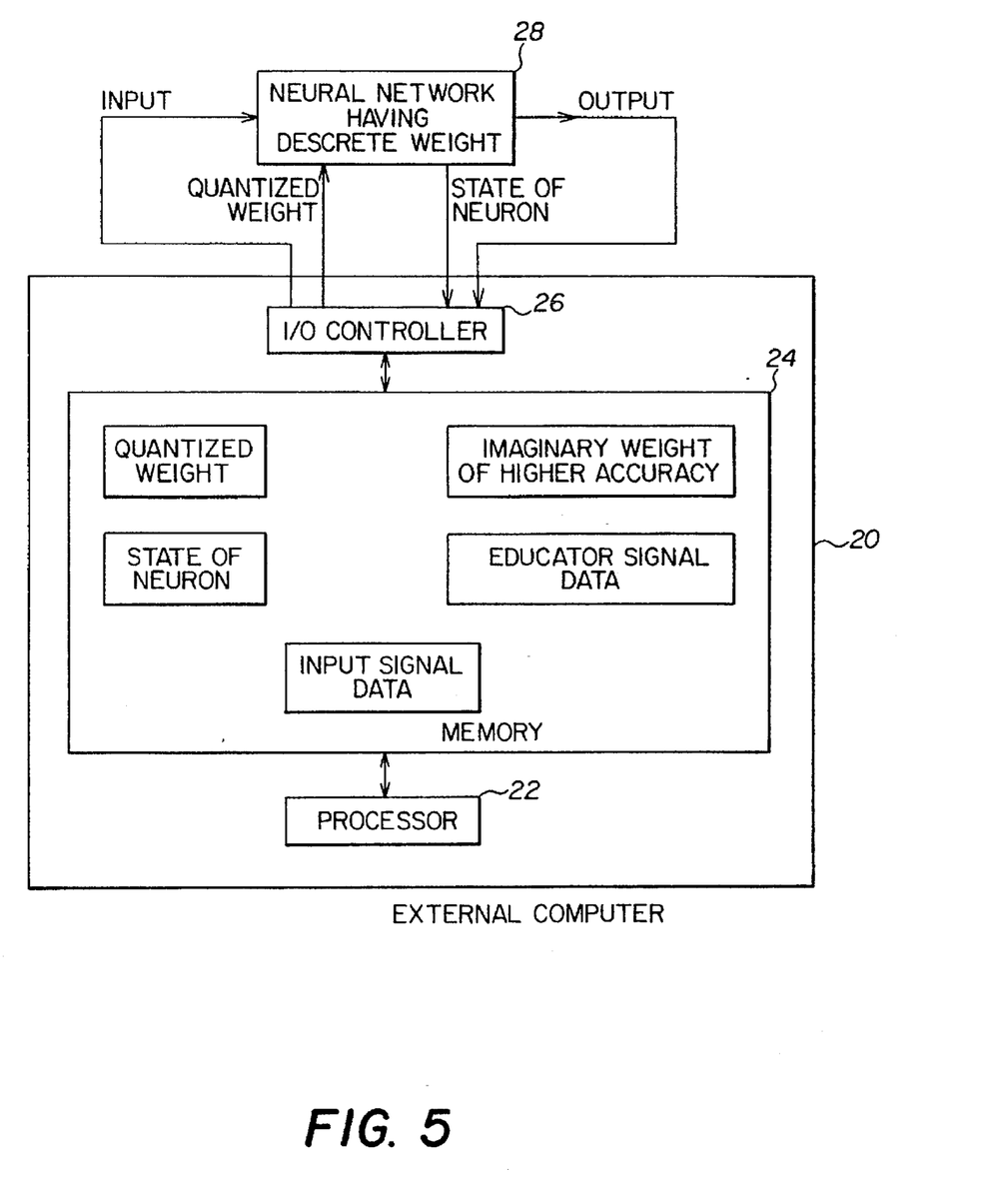
FIG. 5 illustrates a computer system suitable for implementing the learning method of the present invention.

The system of FIG. 5, suitable for practicing the learning method of the invention, includes a computer 20 having a processor 22, memory 24 and Input/Output (I/O) controller 26. The processor 22 performs arithmetical and logical operations and controls the sequence of such operations in a manner well-known in the art.

The memory 24 stores: the set of educator signals (m pairs of $V^{I(m)}$ inputs and corresponding desired $V^{O(m)}$ outputs); information concerning neuron states (i.e., thresholds $\theta$) from the neural network; imaginary weights taken from a range of continuous values; and the corresponding discretized (quantized) weights for the neural network.

The I/O controller 26 connects computer 20 to a neural network 28 which has discrete weights. Input signals and the quantized weights are applied to the neural network 28 by the computer 20 through this controller 26.

Alternatively, the set of discrete weights need not be stored in the quantized weight portion of memory 24 where the neural network performs discretization, or quantization, directly. The imaginary weights can be applied directly to the neural network which in turn quantizes the imaginary weights to obtain the discrete weights. For example, a simple threshold circuit in the neural network 28 may provide this function of quantization.

In opto-electronic neural networks, including optical neuron computers, the interconnection strengths are provided by a spatial light modulator (SLM). In an SLM, an array of pixels takes on binary values (i.e., a pixel is either transparent or opaque).

In resistor-type neural networks, an array of amplifiers have their inputs and outputs interconnected through a matrix of resistive coupling elements. The coupling elements are programmable to be either on or off. (See Graf, H. P. et al., "VLSI Implementation of a Neural Network Model", Computer, March 1988, p. 41). Alternatively, outputs of amplifiers may be connected to control two switches. Between two amplifiers, two memory cells control two other switches, respectively. Three connection states are possible: excitatory, inhibitory and disabled.

A neural network with discrete interconnection strengths may also be implemented using digital programmable elements as shown in Duranton, U.S. Pat. No. 4,994,982. This method may be applied to such a neural network as well.

Another type of neural network on which this learning method may be used is a VLSI neural network using pulse-stream arithmetic, such as shown in Murray, A. F., "Asynchronous VLSI Neural Networks Using Pulse-stream Arithmetic," IEEE Journal of Solid-State Circuits, Vol. 23, No. 3, June 1988. Such a network has digitally programmable weights. In the cited reference, the weight is 5 digital bits, corresponding to a discrete range of 32 weights.

Referring now to FIG. 3, the imaginary interconnection strengths $W^{IH}_{ij}$ and $\underline{W}^{HO}_{ij}$ are initialized in the memory 24 as random numbers, according to the distribution shown in FIG. 4A (step ST9). The imaginary interconnection strengths are then discretized and stored in memory 24 so as to determine the actual interconnection strengths $\underline{W}^{IH}{}_{ij}$ and $\underline{W}^{O}{}_{ij}$ (initial values) of the neural network (step ST10). FIG. 4B illustrates a case where there are three possible discrete values for the interconnections. However, the present invention is not limited to this arrangement. The range of possible discrete values depends on the actual neural network used.

Next, the variable m (m=1, 2, . . . , M), denoting the number of educator signals, is initialized (step ST11). After the interconnection strengths in the neural network 28 are set to the discretized values, the actual output signal $V^O$ from the neural network in response to $V^{I(m)}$ of the m-th input educator signal is obtained. The actual output can be defined by using the discrete interconnection strengths $\underline{W}^{IH}{}_{ij}$ and $\underline{W}^{HO}{}_{ij}$ in accordance with Equations (2) and (3) (step ST12).

Then, the quantities of update $\Delta W^{IH}{}_{ij}$ and $\Delta W^{HO}{}_{ij}$ are calculated using equations (4) and (5) by using the discrete strengths $\underline{W}^{IH}{}_{ij}$ and $\underline{W}^{HO}{}_{ij}$ (step ST13). The calculated quantity of update is added to the imaginary interconnection strengths $W^{IH}{}_{ij}$ and $W^{HO}{}_{ij}$ using equations (6) and (7) (step ST14) to update them. Then, the imaginary interconnection strengths $W^{IH}{}_{ij}$ and $W^{HO}{}_{ij}$ are discretized in accordance with the relationship defined by FIGS. 4A and 4B. Thus, updated discrete interconnection strengths $\underline{W}^{IH}{}_{ij}$ and $\underline{W}^{HO}{}_{ij}$ of the neural network are determined (step ST15).

For all of the educational signals (M signals), the square error between the actual output signal $V^O$ and the desired output signal $V^{O(m)}$ with respect to $V^{I(m)}$ of the educator signal, is calculated for each neuron of the output layer. If any of the sums of the square errors is less than a convergence criterion value ϵ, learning is ended (step ST16). If any of the above-described square errors exceeds ϵ, and the educator signal which has been learned immediately before is the M-th signal (step ST17), the variable m is again initialized (step ST11). Learning is then repeated by incrementing the variable m by one until the actual output $V^O$ of the neural network in response to $V^{I(m)}$ is suitably approximate to the corresponding desired output $V^{O(m)}$ (correct output), with respect to all of the educator signals.

As described above, the quantities of update $\Delta W^{IH}{}_{ij}$ and $\Delta W^{HO}{}_{ij}$ are calculated by using the discrete interconnection strengths, $\underline{W}^{IH}{}_{ij}$ and $\underline{W}^{HO}{}_{ij}$ are added to the imaginary interconnection strengths, $W^{IH}{}_{ij}$ and $W^{HO}{}_{ij}$, which take continuous values. The imaginary interconnection strength is then discretized. As a result, an updated discrete interconnection strength is determined. Therefore, even if the quantities of a sole update operation, $\Delta W^{IH}{}_{ij}$ and $\Delta W^{HO}{}_{ij}$, are smaller than the difference between the values of the discrete interconnection strengths of the neural network, the above-described quantities of update are added to the imaginary interconnection strength, and are thus stored. As a result, the interconnection strength of the network can be varied between the discrete values after being subjected to a plurality of updating operations. As a result, the interconnection strength can be updated and learning can be performed in a neural network having a discrete interconnection strength.

According to this embodiment, the back-propagation method is applied to a neural network having a discrete interconnection strength. The present invention may be applied to other learning methods. A similar effect can be obtained by improving other learning methods in such a manner that an imaginary interconnection strength taking continuous values is induced, the imaginary interconnection strength is updated by using a quantity of update obtained by using the discrete interconnection strength of the neural network, and the imaginary interconnection strength is discretized to update the discrete interconnection strength of the neural network.

Although the preferred embodiment of the invention has been described in detail it is to be understood that the details of construction and the combination and arrangement of parts in the present disclosure of the preferred embodiment may be changed without departing from the spirit and scope of the invention as hereinafter claimed.

What is claimed is:

1. A learning method for a neuron computer having a plurality of neurons and interconnections among the neurons, wherein each interconnection has a weight, wherein at least one weight is taken from a discrete set of possible weights, the learning method comprising the steps of:

(a) applying an input to the neuron computer;

(b) obtaining an actual output from the neuron computer;

(c) for each interconnection of the neuron computer having a weight taken from the discrete set, (i) calculating an update quantity by comparing the actual output to a desired output associated with the applied input to obtain an error and by calculating the update quantity as a function of the error and outputs of neurons of the neuron computer, (ii) updating an imaginary interconnection strength taken from a range of values, wherein each possible weight in the discrete set corresponds to more than one value in the range of values and each value in the range of values corresponds to only one possible weight in the discrete set, using the calculated update quantity, (iii) discretizing the updated imaginary interconnection strength by converting the updated imaginary interconnection strength to the corresponding weight in the discrete set; and (iv) setting the weights of the neuron computer to the corresponding discretized updated imaginary interconnection strengths; and (d) repeating all steps for a plurality of inputs, until errors in the actual output with respect to the desired output of the neuron computer are below a predetermined value.

2. The learning method of claim 1, wherein the step of applying an input comprises the steps of:

(a) inputting a set of educator signals, each educator signal comprising an input and a corresponding desired output;

(b) selecting an educator signal from said set of educator signals; and (c) applying the input of the selected educator signal to the electrical neural network.

3. The learning method of claim 1, wherein the step of calculating the update quantity comprises the step of squaring the calculated error.

4. The teaming method of claim 1, wherein the neurons of the neuron computer form an input layer, an intermediate layer and an output layer and wherein the step of calculating the update quantity includes the step of calculating $$\Delta W^{IH}{}_{ij} = -\alpha V^H{}_i (1 - V^H{}_i) V^I{}_j \sum_{k=1}^{no} V^O{}_k (1 - V^O{}_k) W^{HO}{}_{ki} (V^O{}_k - V^{O(m)}{}_k)$$

and $$\Delta W^{HO}{}_{ij} = -\alpha V^O{}_i (1 - V^O{}_i) V^H{}_j (V^O{}_i - V^{O(m)}{}_i)$$

for all i and j, where i and j are integers, wherein $\Delta W^{IH}{}_{ij}$ represents the update quantity for the interconnection between an i-th neuron in the intermediate layer and a j-th neuron in the input layer, $\Delta W^{HO}ij$ represents the update quantity for the interconnection between an i-th neuron in the output layer and a j-th neuron in the intermediate layer, $W^{HO}{}_{ki}$ represents the weight of the interconnection between a k-th neuron in the output layer and an i-th neuron in the intermediate layer, wherein k is an integer, $V^O m$, $V^H m$, and $V^I m$ represent an m-th (m=i,j or k) output of the output, intermediate and input layers respectively, $\alpha$ represents a learning rate, $n_O$ represents the number of neurons in the output layer, and $V^{O(m)}$ represents the desired output associated with the input applied to the neuron computer.

5. A learning method for an optical neural network, the optical neural network having a plurality of neurons and interconnections among the plurality of neurons, wherein each interconnection has a strength, wherein at least one strength is taken from a discrete range of values, the learning method comprising the steps of:

applying an input to the optical neural network;

obtaining an actual output from the optical neural network;

calculating a quantity of update for the strength of each interconnection having a strength taken from a discrete range of values by comparing the actual output to a desired output to obtain an error and by calculating the quantity of update as a function of the error and outputs of the plurality of neurons of the optical neural network;

updating an imaginary interconnection strength taken from a second range of values for each interconnection having a strength taken from the discrete range of values, wherein each value in the discrete range of values corresponds to more than one value in the second range of values, and wherein each value in the second range of values corresponds to only one value in the discrete range of values, by using the calculated quantity of update;

discretizing each imaginary interconnection strength by converting the imaginary interconnection strength to the corresponding value in the discrete range of values;

setting each strength taken from a discrete range of values in the optical neural network to the corresponding discretized imaginary strength; and repeating all steps for a plurality of inputs, until the actual output of the optical neural network converges.

6. The learning method of claim 5, wherein the step of comparing the actual output to a desired output includes the step of squaring a calculated difference between the actual output and the desired output.

7. The learning method of claim 5, wherein neurons of the optical neural network form an input layer, an intermediate layer and an output layer, and wherein the step of calculating the quantity, of update includes the step of calculating $$\Delta W^{IH}ij = -\alpha V^H i(1 - V^H i)V^I j \sum_{k=1}^{n_o} V^O k(1 - V^O k)W^{HO}{}_{ki}(V^O k - V^{O(m)}k)$$

and $$\Delta W^{HO}ij = -\alpha V^O i(1 - V^O i)V^H j(V^O i - V^{O(m)}i)$$

for all i and j, wherein i and j are integers, wherein, $\Delta W^{IH}ij$ represents the quantity of update for the interconnection between an i-th neuron in the intermediate layer and aj-th neuron in the input layer, $\Delta W^{HO}ij$ represents the quantity of update for the interconnection between an i-th neuron in the output layer and aj-th neuron in the intermediate layer, $W^{HO}{}_{ki}$ represents the strength of the interconnection between a k-th neuron in the output layer and an i-th neuron in the intermediate layer, wherein k is an integer, $V^O m$, $V^H m$, and $V^I m$ represent an m-th (m=i,j or k) output of the output, intermediate and input layers respectively, $\alpha$ represents a learning rate, $n_O$ represents the number of neurons in the output layer, and $V^{O(m)}$ represents the desired output associated with the input applied to the optical neural network.

8. A learning method for an optical neural network, the optical neural network comprising neurons and interconnections among the neurons wherein each interconnection has an imaginary strength taken from a first range of values and an actual strength taken from a discrete range of values, wherein each value in the discrete range of values corresponds to more than one value in the first range of values and wherein each value in the first range of values corresponds to only one value in the discrete range of values, the learning method comprising the steps of:

(a) inputting a set of educator signals, each educator signal comprising an input and a corresponding desired output;

(b) selecting an educator signal from the provided set;

(c) discretizing the imaginary interconnection strength of each interconnection by converting the imaginary interconnection strength to the corresponding value in the discrete range of values to obtain the actual strength of the interconnection and setting the actual strength of the interconnection to the obtained actual strength;

(d) applying an input, corresponding to the selected educator signal to the optical neural network;

(e) obtaining an actual output from the optical neural network;

(f) calculating the error between the actual output of the optical neural network and the corresponding desired output of the selected educator signal;

(g) calculating an update value for each interconnection on the basis of the calculated error and outputs of the neurons of the optical neural network;

(h) adding the calculated update values to the imaginary interconnection strengths; and (i) repeating steps (b) through (i) until the actual output of the optical neural network converges.

9. The learning method as set forth in claim 8, wherein the step of calculating the error includes the step of squaring the calculated error.

10. The learning method, as set forth in claim 8, wherein neurons of the optical neural network form an input layer, an intermediate layer and an output layer, and wherein the step of calculating the update includes the step of calculating $$\Delta W_{ij}^{IH} = -\alpha V_i^H(1 - V_i^H)V_j^I \sum_{k=1}^{n_o} V_k^O(1 - V_k^O)^O W_{ki}^{HO}(V_k^O - V_k^{O(m)})$$

and $$\Delta W_{ij}^{HO} = -\alpha V_i^O(1 - V_i^O)V_j^H(V_i^O - V_i^{O(m)})$$

for all i and j wherein i and j are integers, $\Delta W_{ij}^{IH}$ represents the update value for the interconnection between an i-th neuron in the intermediate layer and aj-th neuron in the input layer, $\Delta W_{ij}^{HO}$ represents the update value for the interconnection between an i-th neuron in the output layer and aj-th neuron in the intermediate layer, $W^{HO}{}_{ki}$ represents the actual strength of the interconnection between a k-th neuron in the output layer and an i-th neuron in the intermediate layer, wherein k is an integer,.

$V^O_m$, $V^H_m$, $V^I_m$ represent an m-th (m=i,j or k) output of the output, intermediate and input layers respectively, α represents the learning rate, $n_O$ represents the number of neurons in the output layer, and $V^{O(m)}$ represents the desired output corresponding to input applied to the optical neural network.

11. A learning method for an optical neural network, the optical neural network having a plurality of neurons and interconnections among the plurality of neurons, wherein at least one of the interconnections has a discrete weight taken from a discrete set of possible weights, the learning method comprising the steps of:

providing, for each interconnection having a discrete weight, an imaginary interconnection strength taken from a range of values, wherein each possible weight in the discrete set corresponds to more than one value in the range of values and each value in the range of values corresponds to only one possible weight in the discrete set;

discretizing the imaginary interconnection strengths by converting each imaginary interconnection strength to the corresponding weight in the discrete set;

setting the discrete weights of the optical neural network to the corresponding discretized imaginary interconnection strengths;

applying an input to the optical neural network;

obtaining an actual output from the optical neural network;

for each interconnection of the optical neural network having a discrete weight, calculating a quantity of update by calculating an error between the actual output and a desired output for the applied input and by calculating the quantity of update as a function of the error and outputs of neurons of the optical neural network, updating the corresponding imaginary interconnection strength by using the calculated quantity of update, and discretizing the updated imaginary interconnection strength;

repeating the steps of setting, applying, obtaining, calculating, update and discretizing until the actual output of the optical neural network converges.

12. The learning method of claim 11, wherein the step of comparing the actual output to the desired output includes the step of squaring a calculated difference between the actual output and the desired output.

13. The learning method of claim 11, wherein neurons of the optical neural network from an input layer an intermediate layer and a hidden layer, and wherein the step of calculating the quantity of update includes the step of calculating $$\Delta W^{IH}{}_{ij} = -\alpha V^H_i(1-V^H_i)V^I_j \sum_{k=1}^{n_o} V^O_k(1-V^O_k)W^{HO}{}_{ki}(V^O_k - V^{O(m)}_k),$$

and $$\Delta W^{HO}{}_{ij} = -\alpha V^O_i(1-V^O_i)V^H_j(V^O_i - V^{O(m)}_i)$$

for all i and j wherein i and j are integers, $W^{IH}{}_{ij}$ represents the quantity of update for the interconnection between an i-th neuron in the intermediate layer and a j-th neuron in the input layer, $W^{HO}{}_{ij}$ represents the quantity of update for the interconnection between an i-th neuron in the output layer and a j-th neuron in the intermediate layer, $W^{HO}{}_{ki}$ represents the discrete weight of the interconnection between a k-th neuron in the output layer and an I-th neuron in the intermediate layer, wherein k is an integer, $V^O_m$, $V^H_m$, and $V^I_m$ represent an m-th (m=i,j or k) output of the output, intermediate and input layers respectively, α represents a learning rate, $n_o$ represents the number of neurons in the output layer, and $V^{O(m)}$ represents the desired output corresponding to the input applied to the optical neural network.

14. A learning method for an optical neural network having a plurality of neurons and interconnections among the neurons, wherein each interconnection has a weight, wherein at least one weight is taken from a discrete set of possible weights, the learning method comprising the steps of:

a. applying an input to the optical neural network;

b. obtaining an actual output from the optical neural network;

c. for each interconnection of the optical neural network having a weight taken from the discrete set,
 (i) calculating an update quantity by calculating an error between the actual output and a desired output associated with the applied input and by calculating the update quantity as a function of the error and outputs of neurons of the optical neural network,
 (ii) updating an imaginary interconnection strength taken from a range of values using the calculated update quantity, wherein a value in the range of values has only one corresponding weight in the discrete set, and a weight in the discrete set has more than one corresponding value in the range of values;
 (iii) discretizing the updated imaginary interconnection strength by determining the weight in the discrete set corresponding to the updated imaginary interconnection strength; and
 (iv) setting the weight of the interconnection to the discretized updated imaginary interconnection strength; and d. repeating all steps for a plurality of inputs until errors in the actual output with respect to the desired output of the optical neural network are below a predetermined value.

15. The learning method of claim 14, wherein the step of applying an input comprises the steps of:

(a) inputting a set of educator signals, each educator signal comprising an input and a corresponding desired output;

(b) selecting an educator signal from said set of educator signals and (c) applying the input of the selected educator signal to the optical neural network.

16. The learning method of claim 14, wherein the step of calculating the update quantity comprises the step of squaring the calculated error.

17. The learning method of claim 14, wherein neurons of the optical neural network form an input layer, an intermediate layer and an output layer and wherein the step of calculating the update quantity comprises the step of calculating $$\Delta W^{IH}{}_{ij} = -\alpha V^H_i(1-V^H_i)V^I_j \sum_{k=1}^{n_o} V^O_k(1-V^O_k)W^{HO}{}_{ki}(V^O_k - V^{O(m)}_k)$$

and $$\Delta W^{HO}{}_{ij} = -\alpha V^O_i(1-V^O_i)V^H_j(V^O_i - V^{O(m)}_i)$$

for all i and j, where i and j are integers, wherein $\Delta W^{IH}{}_{ij}$ represents the update quantity for the interconnection between an i-th neuron in the intermediate layer and a j-th neuron in the input layer, $\Delta W^{HO}{}_{ij}$ represents the update quantity for the interconnection between an i-th neuron in the output layer and a j-th neuron in the intermediate layer, $W^{HO}{}_{ki}$ represents the weight of the interconnection between a k-th neuron in the output layer and an i-th neuron in the intermediate layer, wherein k is an integer, $V^O{}_m$, $V^H{}_m$, and $V^I{}_m$ represent an m-th (m=i,j or k) output of said output intermediate and input layers respectively, $\alpha$ represents a learning rate, $n_O$ represents the number of neurons in the output layer, and $V^{O(m)}$ represents the desired output associated with the input applied to the optical neural network.

18. The method of claim 14 wherein the optical neural network is an optoelectronic neural network.

19. The method of claim 18 wherein the step of setting the weights of the interconnections in the optical neural network comprises the step of setting weights defined by a spatial light modulator.

20. The method of claim 14 wherein the optical neural network is an optical neural computer.

21. The method of claim 20 wherein the step of setting the weights of the interconnections in the optical neural network comprises the step of setting weights defined by a spatial light modulator.

22. The method of claim 14 wherein the step of setting the weights of the interconnections in the optical neural network comprises the step of setting weights defined by a spatial light modulator.

23. A learning method for a neuron computer having a plurality of neurons and interconnections among the neurons, wherein each interconnection has a weight, wherein at least one weight is taken from a discrete set of possible weights, the learning method comprising the steps of:

(a) applying an input to the neuron computer;

(b) obtaining an actual output from the neuron computer;

(c) calculating an error between the actual output and a desired output associated with the applied input;

(d) propagating the calculated error backwards through the neuron computer to obtain an update quantity for each interconnection;

(e) for each interconnection having a weight taken from the discrete set,
  (i) updating an imaginary interconnection strength taken from a range of values, wherein each possible weight in the discrete set corresponds to more than one value in the range of values and each value in the range of values corresponds to only one possible weight in the discrete set, using the calculated update quantity for the interconnection,
  (ii) discretizing the updated imaginary interconnection strength by converting the updated imaginary interconnection strength to the corresponding weight in the discrete set, and
  (iii) setting the weights of the neuron computer to the corresponding discretized updated imaginary interconnection strengths; and (f) repeating all steps for a plurality of inputs, until errors in the actual output with respect to the desired output of the neuron computer are below a predetermined value.

24. A learning method for a neuron computer having a plurality of neurons and interconnections among the neurons, wherein each interconnection has a weight, wherein at least one weight is taken from a discrete set of possible weights, the learning method comprising the steps of:

(a) applying an input to the neuron computer;

(b) obtaining an actual output from the neuron computer;

(c) for each interconnection of the neuron computer having a weight taken from the discrete set,
  (i) calculating an update quantity by comparing the actual output to a desired output associated with the applied input to obtain an error and by calculating the update quantity as a function of the error and weights of interconnections of the neuron computer,
  (ii) updating an imaginary interconnection strength taken from a range of values, wherein each possible weight in the discrete set corresponds to more than one value in the range of values and each value in the range of values corresponds to only one possible weight in the discrete set, using the calculated update quantity,
  (iii) discretizing the updated imaginary interconnection strength by converting the updated imaginary interconnection strength to the corresponding weight in the discrete set, and
  (iv) setting the weights of the neuron computer to the corresponding discretized updated imaginary interconnection strengths; and (d) repeating all steps for a plurality of inputs, until errors in the actual output with respect to the desired output of the neuron computer are below a predetermined value.

25. The learning method of claim 24 wherein the step of calculating the update quantity further includes using outputs of the neurons of the neuron computer.

* * * * *

UNITED STATES PATENT AND TRADEMARK OFFICE
CERTIFICATE OF CORRECTION

PATENT NO. : 5,644,681

DATED : July 1, 1997

INVENTOR(S) : Masanobu Takahashi, Shuichi Tai, Keisuke Kojima, Toshio Shinnishi and Kazuo Kyuma It is certified that error appears in the above-identified patent and that said Letters Patent is hereby corrected as shown below:

Column 1, line 44, change "$(-I-\theta)$" to -- $(-I+\theta)$ --.

Column 3, line 26 change "DRAWINGS" to -- DRAWINGS --.

Column 5, line 42, change "$W^{HO}_i$are" to -- $W^{HO}_{ij}$, and are --.

Column 6, line 51 change "neural network" to -- neuron computer --;
  line 55 change "teaming" to -- learning --.

Column 7, line 67 change "aj-th" to -- a j-th --.

Column 8, line 41 change "(b) through (i) to -- (b) through (h) --.

Column 9, line 1, change "$V^O{}_m, V^H{}_m, V^I{}_m$" to --  --.
  line 48 change "an input layer" to -- an input layer, --;
  line 49 change "a hidden layer" to -- an output layer --;
  line 65 delete "discrete weight" and insert -- strength --;
  line 66 change "I-th" to -- i-th --.

Column 11, line 6 after "said output" insert a comma.

Signed and Sealed this

Fourteenth Day of April, 1998

Attest:

*Attesting Officer*

BRUCE LEHMAN

*Commissioner of Patents and Trademarks*